US007955476B2

(12) United States Patent
Mansur

(10) Patent No.: US 7,955,476 B2
(45) Date of Patent: Jun. 7, 2011

(54) MULTIPLE APPLICATION PURIFICATION AND RECYCLING DEVICE

(75) Inventor: Pierre G. Mansur, Miami, FL (US)

(73) Assignee: Mansur Corporation, Miami, FL (US)

( * ) Notice: Subject to any disclaimer, the term of this patent is extended or adjusted under 35 U.S.C. 154(b) by 967 days.

(21) Appl. No.: 11/654,728

(22) Filed: Jan. 18, 2007

(65) Prior Publication Data
US 2007/0170049 A1    Jul. 26, 2007

Related U.S. Application Data

(60) Provisional application No. 60/760,849, filed on Jan. 20, 2006.

(51) Int. Cl.
*B01D 1/22* (2006.01)
*B01D 1/28* (2006.01)
*B01D 3/08* (2006.01)
*B01D 3/10* (2006.01)
*B01D 3/42* (2006.01)

(52) U.S. Cl. ....... 202/160; 159/6.1; 159/13.2; 159/24.1; 159/44; 159/49; 159/DIG. 16; 202/185.3; 202/182; 202/185.6; 202/205; 202/206; 202/236; 202/238; 203/2; 203/26; 203/89; 203/91; 210/149; 210/179; 210/319; 210/512.1

(58) Field of Classification Search ............. 137/625.15; 159/6.1, 13.2, 24.1, 25.1, 44, 49, DIG. 16; 202/160, 182, 185.2, 185.3, 185.6, 187, 205, 202/206, 236, 238; 203/2, 26, 89, 91; 210/143, 210/145, 148, 149, 179, 183, 319, 512.1
See application file for complete search history.

(56) References Cited

U.S. PATENT DOCUMENTS

| 3,248,306 | A |   | 4/1966  | Cummings |
|-----------|---|---|---------|----------|
| 3,890,205 | A | * | 6/1975  | Schnitzer ................... 202/236 |
| 3,957,588 | A | * | 5/1976  | Humiston ................... 202/172 |
| 4,045,293 | A |   | 8/1977  | Cooksley |
| 4,451,371 | A |   | 5/1984  | Peck |
| 4,504,361 | A | * | 3/1985  | Tkac et al. ................ 202/172 |
| 4,595,460 | A |   | 6/1986  | Hurt |
| 4,695,375 | A |   | 9/1987  | Tyler |
| 4,947,983 | A | * | 8/1990  | Jost ............................ 202/163 |
| 4,957,200 | A | * | 9/1990  | Turner et al. ............... 202/181 |
| 4,957,624 | A |   | 9/1990  | Peranio |
| 4,971,660 | A |   | 11/1990 | Rivers |
| 5,017,284 | A |   | 5/1991  | Miler et al. |
| 5,266,170 | A | * | 11/1993 | Weber et al. ............ 202/185.3 |
| 5,351,199 | A |   | 9/1994  | Ticcioni et al. |
| RE35,283  | E |   | 6/1996  | Helmich |
| 5,772,850 | A | * | 6/1998  | Morris ........................ 202/237 |
| 5,922,092 | A | * | 7/1999  | Taylor ......................... 55/295 |
| 6,365,005 | B1 | * | 4/2002 | Schleiffarth .................. 203/1 |

(Continued)

*Primary Examiner* — Virginia Manoharan
(74) *Attorney, Agent, or Firm* — Malloy & Malloy, P.A.

(57) ABSTRACT

A multiple application recycling and purification device has a coaxial core that is horizontally oriented, non-rotating, cylindrical distillation chamber. The enhanced, completely coaxial configuration continuously cleans the entire distillation chamber and spreads a thin film of liquid to enhance distillation and positively aid in the removal of remaining contaminants. Through a timed and positioned valve, the device removes and purges lower-temperature contaminants. Timed valves and sensors control all phases of the distillation to provide a coaxially integrated, stand-alone, adaptable, scalable and maintenance free distillation unit that self-monitors, self-cleans and economically functions to produce the pure distilled liquid, e.g., water. This device can be modified to purify any numerous array of liquids and can be scaled to produce any amount of purified liquids for either household, commercial, or industrial applications.

39 Claims, 8 Drawing Sheets

U.S. PATENT DOCUMENTS

| | | |
|---|---|---|
| 6,551,466 B1 | 4/2003 | Kresnyak et al. |
| 6,663,770 B2 * | 12/2003 | Sears .......................... 210/175 |
| 6,976,636 B2 | 12/2005 | Thweatt |
| 2004/0104154 A1 | 6/2004 | Sears |
| 2004/0140270 A1 | 7/2004 | Simmons |
| 2004/0245186 A1 | 12/2004 | Wood |
| 2004/0250544 A1 | 12/2004 | Minemi et al. |
| 2005/0011742 A1 | 1/2005 | Yamamoto |
| 2005/0016828 A1 | 1/2005 | Bednarek et al. |
| 2005/0098425 A1 | 5/2005 | Westcott |
| 2006/0011560 A1 | 1/2006 | Ruech et al. |

* cited by examiner

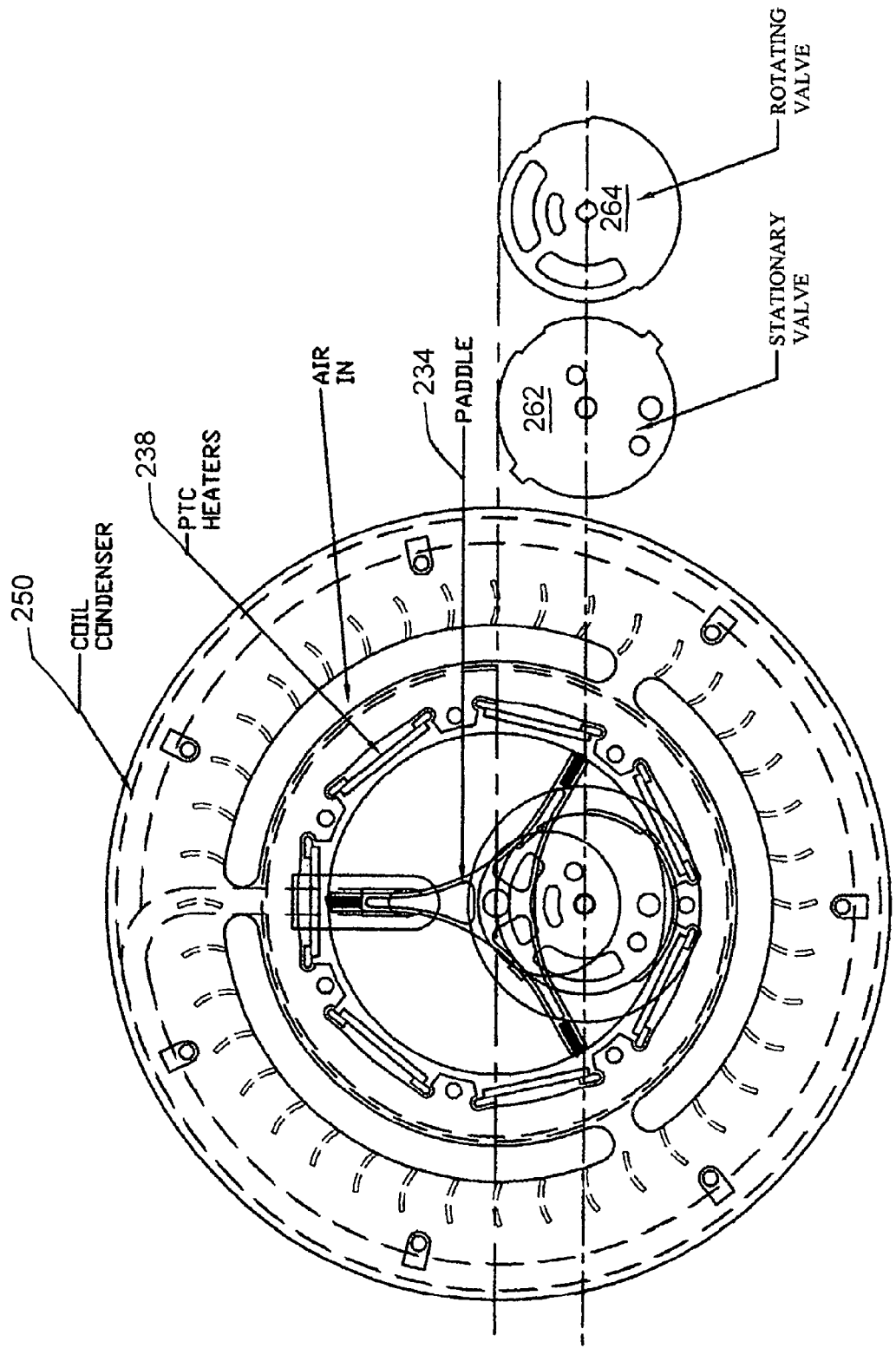

MULTIPLE APPLICATION PURIFICATION AND RECYCLING DEVICE

CROSS-REFERENCE TO RELATED APPLICATION

This application claims the benefit under 35 U.S.C. §119(e) of U.S. Provisional Application No. 60/760,849, filed Jan. 20, 2006, the complete disclosure of which is hereby incorporated by reference herein in its entirety.

STATEMENT REGARDING FEDERALLY SPONSORED RESEARCH OR DEVELOPMENT n/a

FIELD OF THE INVENTION

The present invention lies in the field of liquid purification systems, in particular, to liquid distillation systems.

BACKGROUND OF THE INVENTION

The process of distillation is well known and is regarded as the most effective way to separate toxins, bacteria, chemicals and solids from liquids (such as tap water) to produce a pure liquid (e.g., drinking water). In the past, various water distillation units have been developed to purify tap water in both household and commercial applications. The primary function of these water distillation units is to heat water and condense the resultant vapors in order to separate and remove contaminants from the municipal water supply prior to use. The distillation process involves heating the water to produce steam, followed by a cooling or condensing of the steam to yield pure water and a by-product that contains all of the contaminants that were separated and removed from the water during the heating process. This separation of contaminants takes place as a result of various chemicals and other contaminants boiling at different temperatures than pure water. Some contaminants are carried over in the vapor at lower temperatures, while all solids remain in the distillation chamber as the liquid vaporizes. To effectively and efficiently purify water by distillation, it is important to have a controlled way of venting or capturing unwanted vapors that occur at lower temperatures than the boiling point of pure water. This can be achieved with the use of an activated carbon filter that captures the contaminants and solids that separate from the tap water at these lower temperatures. It is also beneficial to have measures for automatically deactivating the heating elements once the tap water has been completely boiled and converted to the vapor state.

Water distillation units in current use have several shortcomings that limit their usefulness as a practical and desirable way for providing pure water, particularly in a household environment. For instance, water distillation units currently in use are usually bulky and are often designed to require inconvenient and unsightly positioning on countertops. Most of these units require manual filling and/or manual removal of the distilled water prior to use. Periodically, the distillation unit must be manually cleaned to remove calcium deposits and other mineral deposits that build up on the interior surfaces, particularly, in the distillation chamber. These deposits adversely affect the function of many of the components, including the heating element, and limit the overall cleanliness of the unit. The intensive labor for removing these contaminants requires manual disassembly of the unit and separation of parts, which are then soaked in certain chemicals, such as citric acid. The chemicals react with the deposits, eventually causing them to dissolve and separate from the surface of the soaked parts. The production of truly pure distilled water can be problematic, and many water distillers in current use are not entirely effective in removing all the contaminants. Higher quality water distillation units provide for removal or "scrubbing" of contaminants from vapors created in the distillation chamber. Post-filtration using activated media is the accepted method to assure final scrubbing of the distilled water to remove unwanted vapors that pass through the system from the distillation chamber. Although venting the initial vapors before they re-condense is effective, high-quality final scrubbing using post filtration produces the purest water. At present, activated carbon is the preferred media to remove organics and other contaminants due to its natural ability to attract and retain the unwanted and unhealthy chemicals. However, activated carbon filter media becomes saturated in time and must be monitored, maintained, and manually replaced on a regular basis. A further drawback associated with water distillation units in current use is the significant amount of energy required to heat and vaporize water in the distillation process and poor energy efficiency. Furthermore, water in its purest state typically has a neutral or bland taste because it lacks the flavor of the minerals found in water that most people are accustomed to drinking. These flavor-producing minerals are removed by distillation leaving the pure water with a taste that does not appeal to most consumers.

SUMMARY OF THE INVENTION

In view of the limitations now present in the prior art, the present invention provides a new and useful water and diverse fluids purification device utilizing an enhanced distillation process that is simpler in construction, more universally usable, and more versatile in operation than known apparatus of this kind.

The present invention efficiently and effectively purifies water and a variety of other fluids (such as tap water, ocean water, pond water, stream water, river water, street runoff, and industrial waste water, for example) using an enhanced distillation process that can readily be adaptable and scalable for multiple applications. The device according to the invention is a liquid distillation device that can be used, in particular, to produce distilled drinking water in a compact system for low cost. The purification device of the invention overcomes all of the above-described disadvantages of water purification equipment in current use: (i) it is compact and self contained; (ii) it is easy to use; (iii) it is self monitoring; (iv) it automatically self cleans; and (v) it is energy efficient. A valve, in particular, a ceramic valve, is precisely timed and has sensors that automatically control a sequence of functions for providing the pure liquid and for carrying out the automatic self-maintenance functions. The device can connect to a tap water source in households or businesses and automatically and economically creates pure, chilled or heated distilled water for dispensing on-demand and automatically maintains a set schedule to wash the distillation chamber. A liquid dispensing unit can be used for supplying the liquid to be purified to the distillation chamber, the liquid dispensing unit being selectively connected automatically and repetitively to the distillation chamber by a valve to dispense a pre-set amount of the liquid to the distillation chamber. Moreover, any of a variety of flavor agents and/or health benefiting minerals and vitamins may be added to the pure distilled water.

For efficiently heating the liquid in the distillation chamber, a large surface area contact chamber, within a highly efficient micro design, to effectively maximize heat generation, a 25% reduction in power consumption results in the production of purified water for about 1 cent per 8 ounce glass. Scale and contaminant build up inside the boiling chamber is cleaned with a rotating paddle/auger/brush that completely and automatically wipes and polishes the distillation chamber during every cycle. There is virtually no build-up on the chamber walls and contaminants are automatically and forcefully discharged down a drain. Significantly, the purification device can be scaled in size to accommodate any application. For example, the device can be sized to fit inside a vending machine, for example, a school cafeteria, to replace the soda machines currently accessed by 53 million grammar and high school students daily. With the addition of flavoring agents, the device can be used to provide students with the purest and healthiest beverage in the world, for approximately 1 cent a glass. In military applications, the device can be increased in size to produce large quantities of the purest water near a battlefield, natural disaster area, or for humanitarian relief efforts because it can use any available source of water including oceans, rivers, ponds, streams, pools, and, even, stagnant pools. The device can be utilized to purify machine tool coolants and significantly minimize disposal costs, to purify industrial drain traps and eliminate pumping services, and/or to purify any water-based waste hazardous stream generated by a commercial development.

With the foregoing and other objects in view, there is provided, in accordance with the invention, a liquid purification system, comprising a rotationally fixed cylindrical boiling chamber having a cylindrical interior surface defining a central axis, an exterior surface and two opposing end surfaces, the interior surface and the end surfaces defining a distillation chamber. A rotator is rotationally disposed within the distillation chamber about the central axis and radially extends at least partly towards the interior surface. A temperature regulating heater is disposed about the exterior surface and heats liquid in the distillation chamber at least to a boiling point of the liquid. A valve having ports is selectively fluidically connected to the distillation chamber. A valve controller selectively actuates the valve to fluidically connect the ports to the distillation chamber in a given sequence. A motor is connected to the rotator and, when activated, turns the rotator about the central axis at a speed sufficient to form liquid inside the distillation chamber into a film coating the interior surface. A condenser is disposed about the heater and has an inlet fluidically connected to at least one of the ports for receiving distilled vapors from the distillation chamber and a discharge fluidically connected to the inlet for supplying a purified form of the liquid. A blower is disposed about the heater and within the condenser and, when activated, moves environmental air along the condenser to cool the condenser and condense distilled vapors of the liquid inside the condenser.

With the objects of the invention in view, there is also provided a liquid purification system, comprising a rotationally fixed, horizontally disposed cylindrical boiling chamber having a cylindrical interior surface defining a central axis, a exterior surface, and two opposing substantially parallel and planar end surfaces on either side of the interior surface, the interior surface and the end surfaces defining a distillation chamber. A rotator is rotationally disposed within the distillation chamber about the central axis and radially extends at least partly towards the interior surface, the rotator having an outer radial surface. A rotationally fixed, temperature regulating heater is circumferentially disposed about the exterior surface and evenly heats liquid in the distillation chamber at least to a boiling point of the liquid. A rotational valve has ports selectively fluidically connected to the distillation chamber, the ports including a fill port, a purge port, a distilled vapor port a rinse port, and a drain port. A valve controller selectively controls the valve to fluidically connect each of the ports to the distillation chamber in a given sequence. A motor having an axle is connected to the rotator and, when activated, turns the rotator about the central axis at a speed sufficient to form liquid inside the distillation chamber into a film coating the interior surface, the film having a thickness spanning a distance between the outer radial surface of the rotator and the interior surface. A cylindrical condenser is circumferentially disposed about the heater, the condenser having an inlet fluidically connected to the distilled vapor port for receiving distilled vapors from the distillation chamber, a discharge fluidically connected to the inlet for supplying a purified form of the liquid, and a condenser tube fluidically connecting the inlet to the discharge. A cylindrical blower is circumferentially and rotationally disposed about the heater and within the condenser tube and, when activated, moves environmental air along the condenser tube to cool the condenser tube and condense distilled vapors of the liquid inside the condenser tube.

With the objects of the invention in view, there is also provided a liquid purification system, including a rotationally fixed cylindrical boiling chamber having a cylindrical interior surface and two opposing end surfaces, the interior surface and the end surfaces defining a distillation chamber. A rotator is coaxially and rotationally disposed within the distillation chamber and radially extends at least partly towards the interior surface. A coaxial, temperature regulating heater is located at the boiling chamber, the heater, when activated, heating liquid in the distillation chamber at least to a boiling point of the liquid. A coaxial valve having ports is fluidically connected selectively to the distillation chamber. A valve controller selectively controls the valve to fluidically connect the ports to the distillation chamber in a given sequence. A coaxial motor is connected to the rotator and, when activated, turns the rotator at a speed sufficient to form liquid inside the distillation chamber into a film coating the interior surface. A coaxial condenser is disposed about the boiling chamber, the condenser having an inlet fluidically connected to at least one of the ports for receiving distilled vapors from the distillation chamber and a discharge fluidically connected to the inlet for supplying a purified form of the liquid. A coaxial blower is rotationally connected to the motor and disposed about the boiling chamber and within the condenser and, when rotated, moves environmental air along the condenser to cool the condenser and condense distilled vapors of the liquid inside the condenser.

It is accordingly an object of the invention to provide a liquid purification apparatus that overcomes the disadvantages of the general methods currently utilized and that can be used anywhere from the household environment to a large transmission facility, is not bulky, is easy to use, self cleans, and is energy efficient. One exemplary liquid for purification by the apparatus of the present invention is water.

The present invention is generally coaxial, including a cylindrical, centrally located distillation chamber. One of the beneficial features of the present invention is that, by configuring various circular parts around a common axis and nesting them within one another, the apparatus has a compact and efficient shape. Therefore, the term "coaxial" is used herein when referring to the apparatus. In the context of the present invention, "coaxial" means that many or all of the components have a shape that is symmetrical about a common central axis and that some or all of these components are aligned in a single plane that is orthogonal to the central axis.

As will be described herein, having all of the components of the purification device be coaxial is not a requirement. However, the more components that are coaxial makes the device more compact and efficient in volume and, therefore, in cost and/or assembly. As described below, the distillation device can be of any size, whether for countertop use or for industrial applications. For example, the distillation chamber can have a diameter range of between approximately 5 inches and approximately 96 inches. In the latter configuration some parts do not need to be increased in size but others must increase in proportion to the desired used. Therefore, in those configurations, it may be desirable to remove the part(s) which does not need to be larger from the coaxial orientation and make that component(s) only as large as it needs to be for that given application.

The coaxial construction is described beginning with the innermost feature. The horizontally oriented, non-rotating cylindrical distillation chamber representing the coaxial core is completely encircled by either (1) a bonded, proportionally temperature controlled electric heating element, (2) self regulating, non-controlled positive temperature coefficient heating elements, (3) superheated vapor compression passages, or a combination of two or all of these heating sources. The heater to be used almost completely or completely encircles the 360-degree exterior of the distillation chamber with a desired controlled temperature or with a self-regulating, pre-set heat source. Such heat source heaters are easily adjusted to any desired temperature, which allows distillation of various boiling point fluids without any other changes to the unit.

The coaxial configuration is readily adaptable to enhance the performance or reduce the cycle time of purification by incorporating either a vapor compressor or a vacuum pump, depending upon the liquid to be purified. When distilling water, for example, it is advantageous to install a vapor compressor, which by compressing the water vapors raises the vapor's temperature. These superheated vapors are redirected through internal passages to heat the exterior of the cylindrical distillation chamber and act as an energy efficient heat source, giving up latent heat to boil the water in the interior of the distillation chamber. The energy required for the electric motor that turns the compressor is far less than the energy required by conventional electric heating elements.

By slightly varying the configuration of the pump, instead of creating pressure, the pump can create a vacuum in the cylindrical distillation chamber. This vacuum reduces the boiling point of the liquid in the chamber, which allows for safer distillation of certain volatiles and, also, lowers the boiling point of the liquid—which needs less energy to heat and distill.

The interior of the cylindrical distillation chamber is fitted with a shaped coaxial rotator. This rotator can be configured as a paddle, an auger, and/or a brush. In either variation, the rotator performs three functions. First, the paddle/auger/brush's outer edges act, while rotating, as a cleaner for the interior cylindrical surface of the distillation chamber. Cleaning can occur directly, by constant wiping contact of the paddle/auger/brush, or indirectly, by having the paddle/auger/brush rapidly move the fluid to be distilled over the surface of the distillation chamber.

The exterior of the rotator need not be shaped to directly contact the interior cylindrical surface of the distillation chamber. The outer diameter of the rotator can be smaller than the inner diameter of the cylindrical distillation chamber (e.g., the gap can be 0.030" wide). In such a configuration, the rotator creates a thin film on the interior surface of the distillation chamber and, at a rotational velocity that creates this thin film, movement of the liquid between the rotator and the inner surface of the distillation chamber performs the cleaning function by preventing build-up of contaminants. If desired, the rotator can be semi-flexible or can have a portion (e.g., blades) that is of a semi-flexible material, or can be a movable device, that, when exposed to centrifugal forces, moves outward to shorten or entirely close the gap between the rotator and the interior surface of the distillation chamber.

Direct wiping or the movement of liquid prevents any and all build-up on the interior of the distillation chamber resulting from, for example, scale and other sticking contaminants during the heating and distillation cycle. The wiping or rapid fluid movement action totally eliminates any chemical or manual cleaning that is required in conventional distillation processes. Because surface build-up is not carried over in the distillation cycle, there is no adverse insulation barrier that would diminish heat energy transfer into the media being distilled.

Second, because the horizontal non-rotating cylindrical distillation chamber is filled only partially (e.g., ⅓, ½, ¾) with liquid—to provide sufficient room for receipt of vapors and boiling—the rotator acts as a rotating thin film applicator by both spraying and dragging thin layers of the liquid distillate over 360° of the heat-controlled, interior, cylindrical distillation surface. This advantageously enhances the distillation and evaporation process because the entire interior surface of the distillation chamber can be used to heat the liquid instead of just the bottom, which occurs when liquid does not move in the chamber.

Third, the combination of the cylindrical horizontally oriented distillation chamber and the rotating, canted paddles and/or the spiral screw shaped auger allows for thorough mechanical removal of contaminants from the interior walls of the distillation chamber. The entire residue is forcefully directed toward and into a drainage passage. The rotator is turned by an electric motor. Therefore, the horizontally oriented, non-rotating cylindrical distillation chamber of the present invention greatly simplifies surface cleaning, provides a thin film coating for efficient heating, and efficiently removes residue.

The distillation unit can be scaled to any size, from personal use (where the distillation chamber is measured in ounces) to large commercial applications (where the distillation chamber is measured in tens of gallons). Depending upon the scale of the unit, a single valve can be used to control the incoming, purging, vapor, and rinse cycles of the process for operating the unit. Such a valve can also be symmetrical about the central axis. If the valve is of ceramic and is highly polished with extremely flat mating surfaces, the diamond-hard material eliminates the need for rubber seals. Thus, one embodiment having a series of three sandwiched or stacked ceramic discs can provide a life-time seal for the unit. Front and rear stationary discs (e.g., made of ceramic, steel, alloys, or plastic) provide all the passages required to allow incoming, purging, vapor, and rinse cycles of the unit, while the center rotating disc contains a small number of holes or passages for control. By rotating and aligning the center sealing disc to the already perpendicularly aligned front and rear discs, a clear and unobstructed passage is created, while the solid balance of the center disc seals the remaining unused passages. The coaxial single or coaxial series valve is rotated by an electric motor.

To produce purity when distilling water, for example, a pre-set timed or temperature-based sequence is created for rotation of the valve discs to align the passage to positively vent and purge any and all elements that boil out of the water below the water boiling point. Current distillation systems without such control randomly purge these below-water-boiling point contaminants through a small orifice located in the condenser or simply post-scrub the water by passing it through replaceable activated carbon. The present invention eliminates such processes and components.

The generally simple, compact, scalable and readily adaptable purification and recycling device is coaxial, starting with the horizontally oriented cylindrical distillation chamber, which represents the coaxial core. Coaxially located within this cylindrical distillation chamber core is a rotating paddle/auger device. Encircling and axially oriented to the outer diameter of the distillation chamber core is a heating mechanism. On either end of the cylindrical distillation chamber, also coaxial with the cylindrical distillation chamber, is the incoming, purging, vapor, and rinse cycle operational sequencing valve. Holding true to the unit's coaxial form, a layer of insulation can be placed into a cylindrical cavity to encapsulate the heater and is located centrally between the heat source and a centrifugal blower wheel. This blower wheel is also coaxial with the core distillation chamber and is located between the insulation and an outer array of condenser cooling tubes. Similarly, the outer condenser tubes are coaxial with the core and are cooled by movement of the blower wheel.

Simply put, the present invention is directed to an efficient water purification apparatus that includes a configuration of components contained in a compact unit. In a water purification embodiment, the compact water purification apparatus connects to any given water supply and is structured and disposed to automatically and economically create pure distilled water.

Specifically, the apparatus includes timed valves that automatically control a sequence of functions throughout separate cycles of operation, including a distillation cycle and condensation cycle. During the distillation cycle, water is directed into a distillation chamber where it is heated to a boiling temperature by a heating element to produce vapors. During the heating process and before the water boiling point, impurities separate from the water in gaseous form. A purge valve is positioned to remove these vaporous impurities, which occur at temperatures lower than the boiling point of water. Then, after further heating and boiling of the water, the pure water vapors, which occur at a given temperature, are passed through a condenser where they are condensed to produce pure distilled water. The pure distilled water is, then, directed into a containment reservoir for dispensing.

Any quantity of purified water can be stored after production by the present invention by providing the appropriately sized reservoir. The apparatus may, further, be provided with measures of chilling or heating the pure distilled water prior to dispensing. Moreover, any of a variety of flavor agents and/or health benefiting minerals and vitamins may be added to the pure distilled water prior to dispensing.

This apparatus may also be used for industrial purposes and may serve as a great benefit for several industries. For instance, in some states, vehicle repair businesses are required to collect and store contaminated liquids and liquids used for cleaning premises and that contain harmful chemicals. These liquids include the runoff water that is used for cleaning. Not only is storage of these chemicals and/or runoff water costly, these businesses can be charged one dollar per gallon for pick-up and disposal. Use of the present invention eliminates the need to store such liquids as they would be treated and purified continuously by the present invention. Thus, only a temporary input reservoir would be needed to input the contaminated liquid to the device. Such treatment could occur for a fraction of the cost at present.

In accordance with another feature of the invention, there is provided a water and diverse fluids purification device utilizing an enhanced distillation process that is a compact, coaxial, self-contained, self-monitoring, and industry adaptable.

In accordance with an added feature of the invention, there is provided a water and diverse fluids purification device utilizing a configuration that allows for locating the unit in any and all locations.

In accordance with an additional feature of the invention, there is provided a water and diverse fluids purification device utilizing an enhanced distillation process that allows for locating the unit in any and all devices requiring recycling.

In accordance with yet another feature of the invention, there is provided a water and diverse fluids purification device utilizing a horizontally oriented, 360° heated surface cylindrical distillation chamber In accordance with yet a further feature of the invention, there is provided a water and diverse fluids purification device utilizing a variety of regulated measures to heat the liquid.

In accordance with yet an added feature of the invention, there is provided a water and diverse fluids purification device incorporating measures to place the liquid and/or vapors under pressure or vacuum.

In accordance with yet an additional feature of the invention, a water and diverse fluids purification device that incorporates a high-efficient, high surface area, rapid heat transferring element including positive temperature coefficient (PTC) heaters that self-regulate a desired temperature peak.

In accordance with again another feature of the invention, a water and diverse fluids purification device incorporating a vapor compressor to economically use the latent heat of vaporization to boil the water during distillation.

In accordance with again a further feature of the invention, there is provided a water and diverse fluids purification device that can readily change from vapor compression to vacuum thereby lowering the boiling point of any given solvent and chemical.

In accordance with again an added feature of the invention, there is provided a water and diverse fluids purification device that uses a single valve and/or a plurality of coaxial oriented ceramic self cleaning disks.

In accordance with again an additional feature of the invention, there is provided a water and diverse fluids purification device that contains automatic measures to activate all valves, cycles and functions.

In accordance with still another feature of the invention, there is provided a water and diverse fluids purification device that contains automatic measures to signal, time, activate, and control the position of multiple valves.

In accordance with still a further feature of the invention, there is provided a water and diverse fluids purification device that employs a coaxial oriented condensing unit.

In accordance with still an added feature of the invention, there is provided a water and diverse fluids purification device that incorporates a coaxial-oriented, rotating paddle and/or auger to continuously clean and eliminate build-up upon the distillation chamber and/or to create a thin film coating enhancing distillation and/or to forcefully direct and discharge impurities.

In accordance with still an additional feature of the invention, there is provided a water and diverse fluids purification device that incorporates an automatic, positively controlled measure to purge and expel all contaminants below the specified boiling point of the fluid being purified, one example of which is water.

In accordance with another feature of the invention, there is provided a water and diverse fluids purification device that is adaptable to distill solvents and chemicals of any given boiling point by a simple change of temperature setting.

In accordance with a concomitant feature of the invention, there is provided a water and diverse fluids purification device that readily incorporates flavored concentrates, minerals, and/or vitamins to mix with the dispensed distilled water, or additives to diverse fluids.

The foregoing has outlined, in general, the physical aspects of the invention and is to serve as an aid to better understanding the more complete detailed description which is to follow. In reference to such, there is to be a clear understanding that the present invention is not limited to the method or detail of construction, fabrication, material, or application of use described and illustrated herein. Any other variation of fabrication, use, or application should be considered apparent as an alternative embodiment of the present invention.

Other features that are considered as characteristic for the invention are set forth in the appended claims.

Although the invention is illustrated and described herein as embodied in a multiple application purification and recycling device, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

FIG. 9 is a side elevational view of a portion of the apparatus of FIG. 8 with an alternative embodiment of a rotator inside a distillation chamber;

FIG. 10 is an exploded side elevational view of a valve assembly of the apparatus of FIGS. 8 and 9.

DESCRIPTION OF THE PREFERRED EMBODIMENTS

In the figures of the drawings, unless stated otherwise, identical reference symbols denote identical parts.

FIGS. 1 to 7 illustrate a first embodiment of a multiple application purification and recycling device according to the present invention with a horizontally oriented, fixed, cylindrical distillation chamber forming the core of the coaxial distillation device. The distillation chamber incorporates a multi-function mechanical rotating device that produces a thin film coating, cleans, and positively directs all contaminants out of the chamber. The exterior of the cylindrical chamber is peripherally surrounded by a controlled heat-generating source. The steps of inflow, heating, purging vapors, boiling, distillation exit, rinse entry, cleaning, and waste elimination (not necessarily listed in order) are controlled by a valve. The valve can be a rotating valve and can also be coaxial with the distillation chamber. A centrifugal blower wheel is coaxially located between the distillation chamber and an array of condenser tubes, which can be linear or coiled, for example.

Figure 1:
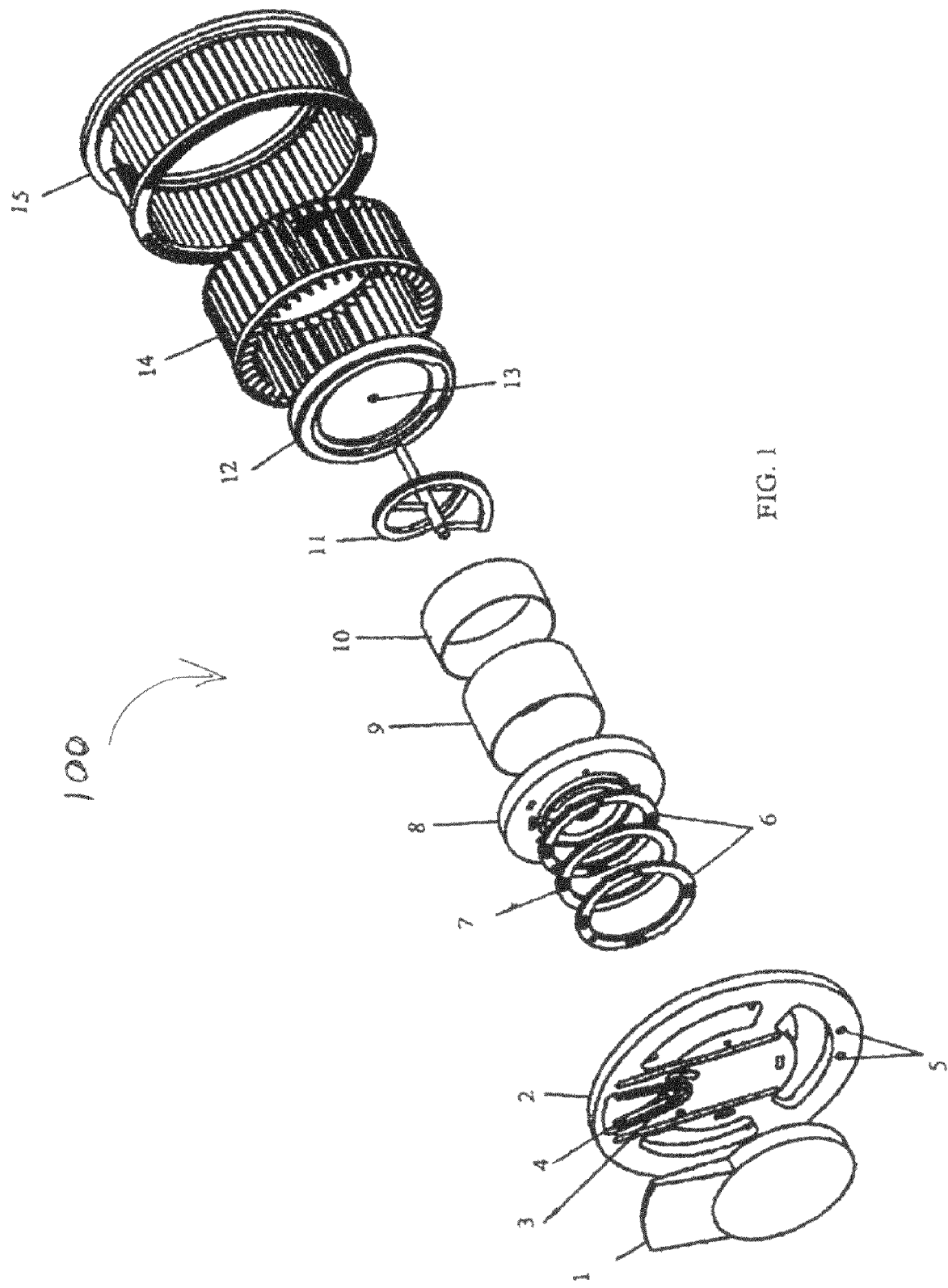
FIG. 1 is an exploded, perspective view of a first embodiment of a coaxial liquid purification apparatus according to the invention with a first embodiment of a heating system.
Figure 2:
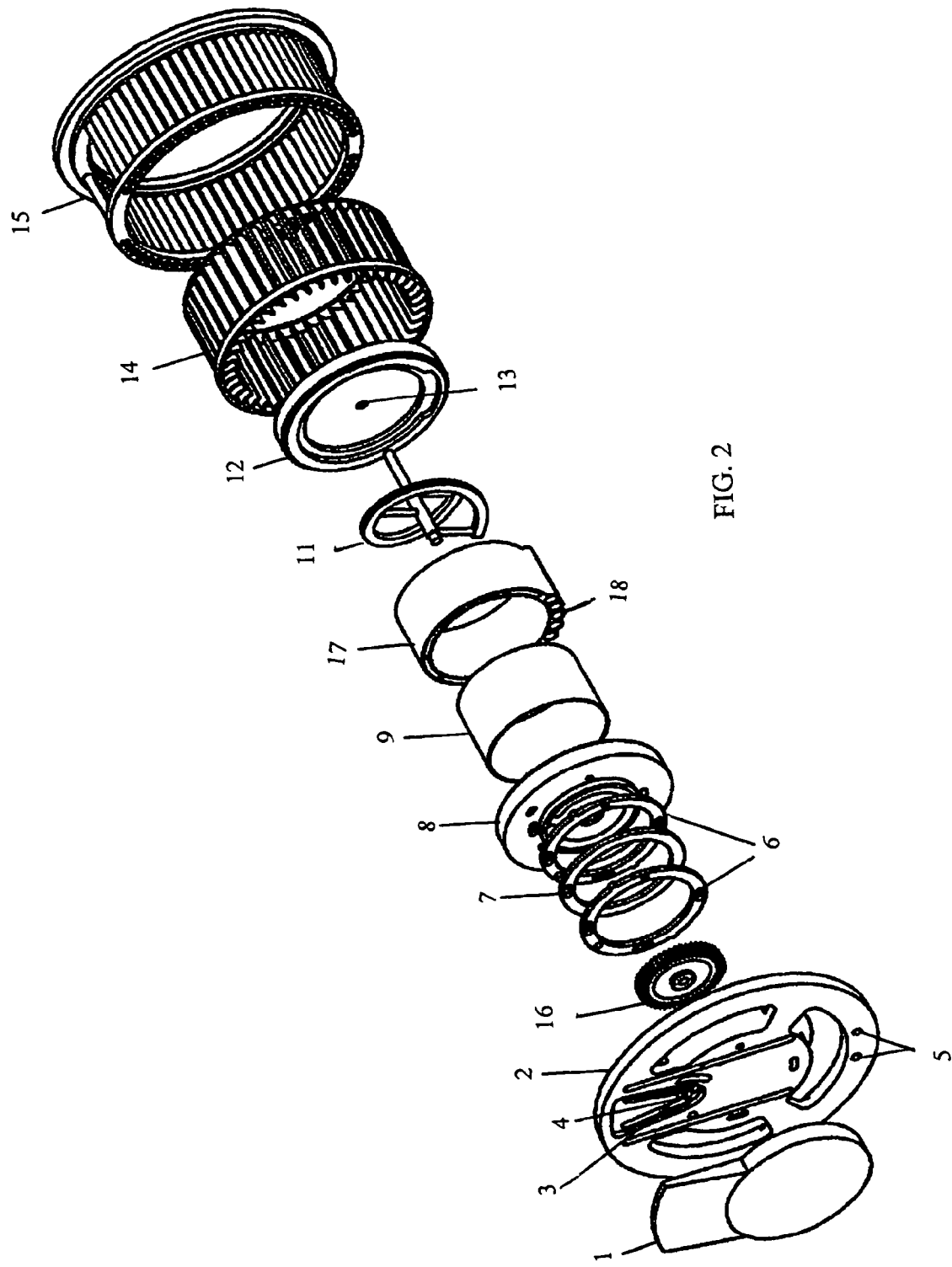
FIG. 2 is an exploded, perspective view of the coaxial water purification apparatus of FIG. 1 with a second embodiment of the heating system.

Referring now to the figures of the drawings, particularly to FIGS. 1 and 2, there is shown a coaxial liquid purification apparatus 100 having a cap 1 that is gas- or fluid-tightly attached to a front housing unit 2. When gas-tight or fluid-tight is used herein, it is understood to mean a connection that substantially prevents a fluid, which can be a gas, from impermissibly penetrating through the respective connection or structure and into the environment or to another undesired area or such that the performance of the purification apparatus 100 is degraded to such an extent that operation no longer is possible. Accordingly, the phrase fluid-tight will be used hereinafter.

Figure 6:
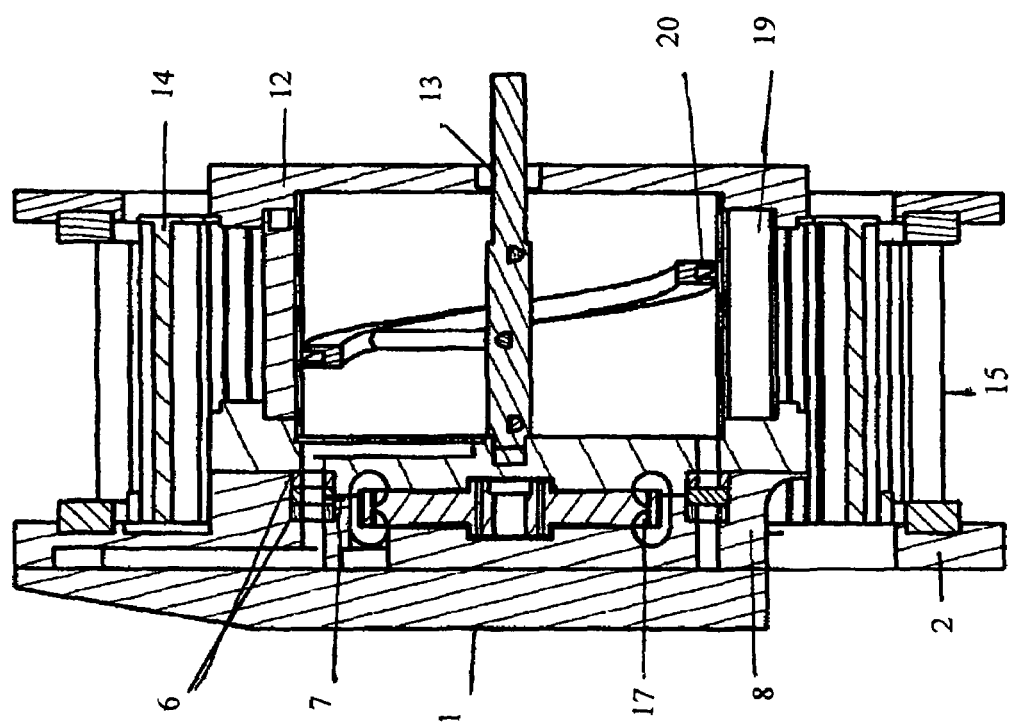
FIG. 6 is a cross-sectional view of the coaxial water purification apparatus of FIGS. 2 and 3 along section line A-A in FIG. 3.

The front housing unit 2 is placed over a first embodiment of a valve that has two stationary disks 6 and one rotating disk 7. See FIG. 7 for greater detail. The disks 6, 7, among other functions described below, control the dispensing of vapors formed during the liquid purification process performed by the purification apparatus 100. The disks 6, 7 can be ceramic, thereby making them extremely hard and smooth. The ceramic nature of the disks 6, 7 also allows them to create a fluid-tight seal with no intermediate structure. These disks 6, 7 are operatively and fluid-tightly connected to a front chamber housing 8, which also contains a fluid-tight seal. This front chamber 8 is fluid-tightly connected to the distillation chamber 9, in which the water to be distilled is filled. Heating measures 10, 17 are disposed about the chamber 9 for substantially even heating within the chamber 9. A rear chamber housing 12 and the front chamber housing 8 define a compartment that encloses the distillation chamber 9 and the heater 10, 17. As shown in FIG. 6, insulation is positioned between the two housing parts 8, 12 to fluid-tightly close off the compartment from the environment.

A rotator 11, here, in the form of an auger, is positioned between a rear chamber housing 12 and the front chamber housing 8 in a fluid-tight rotating connection so that the auger 11 can rotate inside the distillation chamber 9. It is noted that the auger 11 can be replaced by a paddle or a brush. Alternatively, the auger 11 can include various features including a paddle and a brush. The rotator 11 can directly contact the interior surface of the distillation chamber 9 or can be at a distance therefrom. The spinning rotator 11 moves at rotational speeds that spread the liquid into a thin film moving at high speeds within and on the interior surface of the distillation chamber 9. The rotator's movement along with the liquid movement act, together, as a cleaner for the interior cylindrical surface of the distillation chamber 9.

A rotary fan 14 is disposed about the entire assembly of the valve 30 and the housing parts 8, 12 containing the distillation chamber 9. This configuration can be compared to the configuration of FIGS. 8 to 10, which has the fan 240 only partially disposed over the assembly.

The fan 14 and the auger 11 can be connected to separate rotary motors or to the same rotary motor (not illustrated for clarity) and, in either configuration, can rotate at separate or similar rates (using a non-illustrated gear assembly).

Figure 4:
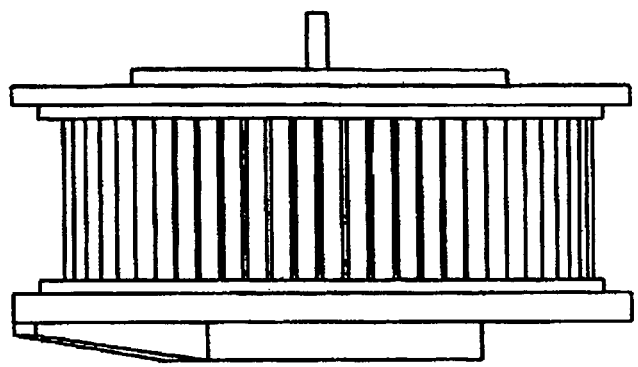
FIG. 4 is a side elevational view of the coaxial water purification apparatus of FIGS. 1 and 2.
Figure 5:
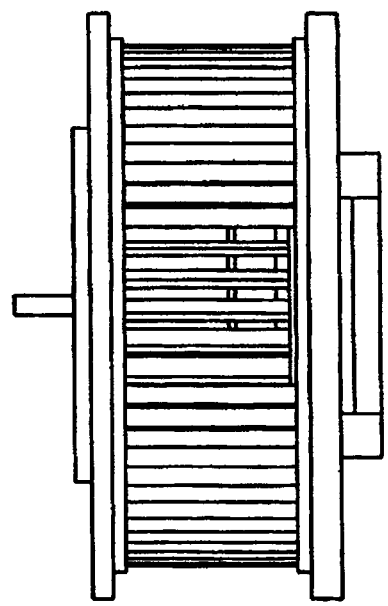
FIG. 5 is a plan view of the coaxial water purification apparatus of FIGS. 1 and 2.
Figure 3:
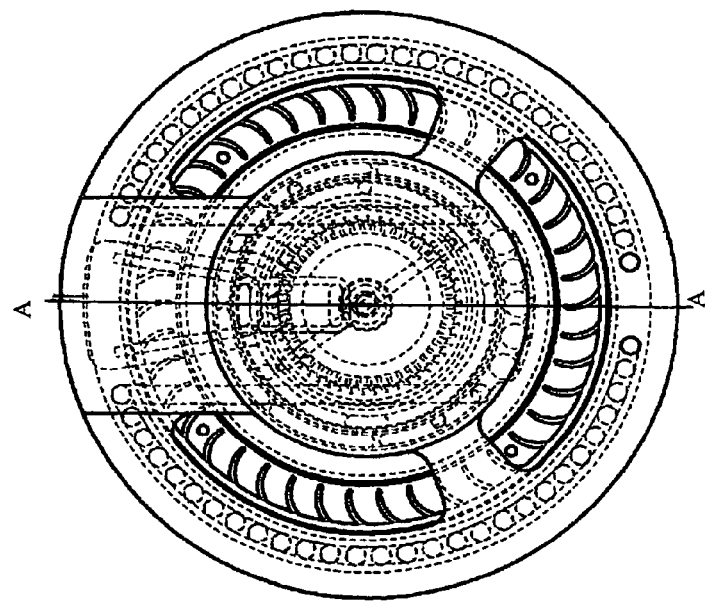
FIG. 3 is a partially hidden, side elevational view of the coaxial water purification apparatus of FIG. 2.

As shown in FIGS. 3 to 5 and, especially, FIG. 6, a first embodiment of a condensation assembly 15 entirely surrounds the fan 14 and all components therein. Because the condensation assembly 15 is a tube that repeatedly turn back upon itself from front to back, this assembly 15 can be said to have a serpentine or S-shaped configuration. This assembly 15, however, can be of any shape so long as it performs the desired condensation function.

Figure 7:
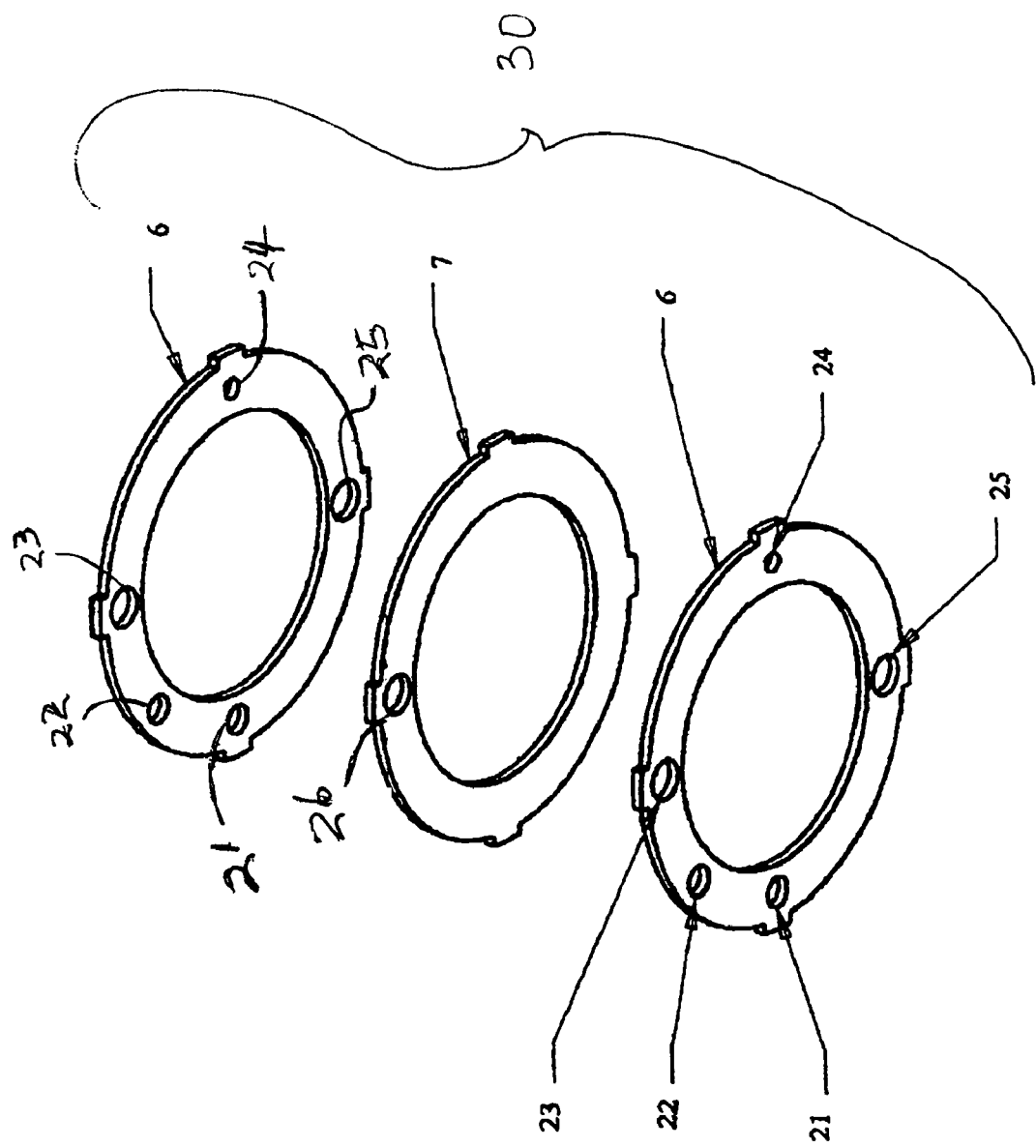
FIG. 7 is an enlarged, exploded view of the stationary and rotating disks of the valve disclosed in accordance with the coaxial water purification apparatus of FIGS. 1 and 2.

To perform the purification process, reference is made to FIGS. 6 and 7. First, the distillation chamber 9 is, preferably, filled partially with the liquid to be distilled. To do so, the hole 26 on the rotational disk 7 is moved into alignment with first fill ports 21 on disks 6. After further rotation of the disk 7 to close off port 21, the distillation chamber 9 heats towards the preset boiling temperature of the liquid to be distilled.

During the entire heating process, the rotator 11 placed inside the distillation chamber rotates at a speed sufficient to create a thin-film of the liquid against the interior surface of the distillation chamber 9, which means that the fluid is moving at a sufficient velocity that it eliminates any build-up of matter on this interior surface. The rotational speed varies with the size of the unit because, with a larger diameter, the rpm can be smaller, due to the fact that centrifugal forces are greater with increased diameter. With a unit having a distillation chamber interior diameter of approximately 5", the speed is between approximately 300 and 1200 rpm, in particular, between approximately 350 and 800 rpm. The rotator 11 provides several simultaneous benefits: it creates the cylindrical film of liquid, it cleans the surface of the distillation chamber directly and/or indirectly, and it pushes out all contaminants, all of which will be discussed more thoroughly below. As a result of the rotator's 11 rotation to spread the liquid inside the distillation chamber 9 into a cylindrical film, more surface area is covered by the liquid and, thereby, allows the liquid to heat up faster. For example, a distillation chamber 9 with a five inch (5") diameter will have a fifteen square inch (15 in$^2$) heating surface as opposed to approximately a six square inch (6 in$^2$) heating surface if the liquid is left only in the bottom half of the chamber 9.

While the heating of the liquid in the distillation chamber 9 takes place, the rotational disk 7, which may be set on a timer, begins to rotate. With the fill port 21 sealed off, the liquid in the chamber 9 is heated and begins to create vapors. Prior to the liquid reaching its boiling temperature (e.g., 100 degrees Celsius for water), the purge ports 22 on the stationary disks 6 are aligned with the port 26 on the rotational disk 7. At this point, all lower-boiling point gases are released into the atmosphere or another non-illustrated chamber. This purge entirely eliminates the use of charcoal filters and the need for final scrubbing of the distillation chamber. Because the valve 30 is closed after the purge, the liquid continues to heat to the necessary boiling temperature. After an appropriate time for boiling the given quantity of liquid, the disk 7 rotates to align the distilled vapor ports 23 of the stationary disks 6 with the port 26 on the rotational disk 7. With this alignment of the distilled vapor ports 23 and port 26, the distilled water vapors are released through vapor exit 3 and delivered to the first condenser tube contained in the condenser assembly 15. Movement of the fan 14 cools the condenser assembly 15 to condense the vapors as they move along and through the condenser assembly 15. The liquid exits the condenser assembly 15 in its purified state and can be dispensed or held in a desired reservoir for later use.

After the liquid is boiled out of the distillation chamber 9 and the chamber 9 is dry, contaminants may be present in the chamber 9. At this point, the port 26 in the rotational disk 7 can be aligned with rinse ports 24 to permit a small amount of liquid to enter into the distillation chamber 9. At this portion of the process, it may not be necessary to heat the liquid to a boiling temperature so that a thorough cleaning can occur using the friction caused by the moving liquid. Of course, the liquid can be boiled if desired. The rotator 11 rotating and/or the internal pressure caused by heating the liquid will push out any contaminants found in the chamber when the waste is to be eliminated. Pressure exists in the chamber after heating the liquid and can be beneficially used for waste removal. After pressure builds, the valve 30 can open the waste exit and forcefully expel the waste, even to a height that is higher than that of the distillation chamber 9. Accordingly, the output of the waste drain no longer needs to be at a lower height than the distillation chamber 9; in other words, for an under-sink sized unit, the pressure can push the waste out and up to a position above a sink trap (so that no effluent heads back towards the unit waste exit).

The rotator 11 may be supplied with wipers 20 (e.g., of Teflon) for better cleaning in certain circumstances. These wipers 20 can be movable such that they are withdrawn/retracted when the thin film exists and to slide out/extend to actually contact the wall of the interior chamber and scrape the wall clean when the thin film does not exist (i.e., the pressure of water >centrifugal force and weight of wiper).

After and during the cleaning process, the hole in the rotational disk 7 can be aligned with a drain port 25 and all contaminants and impurities are pushed out by the rotator 11 or by the internal pressure.

As previously mentioned, at this point of the water purification process, all the distilled water vapors are contained in the condenser assembly 15, which completely covers the fan 14 and covers most of the other components of the coaxial water purification apparatus 100 in this embodiment. The fan 14 rotates in conjunction with the rotator 11 through a fixed connection, however, the fan 14 (even if coaxial) can be connected to a second rotational device for different speeds if desired or can be connected through a non-illustrated gear assembly to rotate at a different speed. The distilled water vapors enter at the top of the condenser assembly 15 in this exemplary embodiment and travel through the structure of the assembly 15, which is s-shaped but can also be coiled, for example. As the vapors travel through the condenser tubes, they are cooled down by the fan 14 and condensation of the purified liquid begins. If the exit is placed at the bottom, the vapors are cooled and condensed into the purified liquid and exit there.

A certain quantity of purified liquid can be stored and be discharged chilled, heated and/or with additives. Where water is being distilled, flavors and/or vitamins can be added.

FIG. 2 shows an alternative heating device of the coaxial purification apparatus of FIG. 1 in the form of a vacuum pump. With the exception of the heating mechanism, the apparatus shown in FIG. 2 performs and uses identical components of that shown in FIG. 1 and, therefore, the description is not repeated for the sake of brevity.

Instead of the heater 10 shown in FIG. 1, a vapor compression chamber 17 along with a vapor compressor or vacuum pump 16 is utilized. The use of a vapor compressor creates a build-up of pressure to, thereby, increase the temperature of the liquid at a quicker rate than by using the heater 10 of FIG. 1. Use of a vacuum pump squeezes the molecules present in the distillation chamber, and, thus, allows the liquid in the distillation chamber to boil at a lower temperature. Use of a vapor chamber allows the coaxial purification apparatus 100 to be more efficient. More specifically, it requires less energy than simply by using a heater 10. The vapor compression chamber is embedded with start-up heaters 18. These start-up heaters 18 provide the initial heating measures for the liquid in the distillation chamber 9. Once the liquid has reached a set temperature, the vapor compression chamber 17 will begin the work on its own to reduce or eliminate the need for using the start-up heaters to, thereby, save energy. The vapor compression chamber, then, generates all the necessary pressure and heat to convert the liquid into vapors. The remaining distillation and cleaning process is conducted in the same manner as discussed above.

FIGS. 8 to 11 illustrate an alternative embodiment of a coaxial liquid purification apparatus 200 according to the present invention. This embodiment illustrates the situation where expanding the size of the apparatus 200 to carry out larger purification loads does not necessarily mean that all components need to be enlarged correspondingly. In particular, the valve does not need to be relatively as large in this embodiment as compared to the embodiment of FIG. 1 or 2. When the apparatus 200 is expanded in size, the valve can be removed from the co-planar configuration and placed adjacent to the distillation chamber as will be explained below.

The coaxial liquid purification apparatus 200 has a motor housing 210 attached to a distillation chamber housing 220. A distillation chamber 230 is attached to the housing 220 at an end opposite the motor housing 210. The distillation chamber 230 defines an interior chamber 232, in which is disposed a rotator 234, here, in the form of an auger, and an exterior chamber 236, in which is disposed a heater assembly 238.

The rotator 234 is rotatably mounted inside the interior chamber 232 about an axle 212. The axle 212 has a fluid tight bearing 214 at the motor housing side of the distillation chamber 230 and a second bearing 216 on the inside surface of the distillation chamber housing 220. Between these two bearings 214, 216 is the fan 240 for cooling the assembly. The fan 240 is directly mounted to the axle 212 or is indirectly mounted thereto through a non-illustrated gear assembly so that the fan 240 can turn at a rate different from the rotation speed of the axle 212. The rotary fan 240 is disposed about the distillation chamber 230 but need not extend entirely over the span of the chamber 230, as shown. This configuration can be compared to the configuration of FIGS. 1 to 1, which has the fan 14 completely disposed over the assembly.

The heater assembly 238 can include PTC heaters for regulating the temperature of the distillation chamber 230. In the embodiment illustrated, there are seven such heaters disposed circumferentially around the interior chamber 232.

The motor 218 is connected to the axle 212 at a connection point 219.

A condenser 250 is mounted outside the distillation chamber housing 220 about the fan 240 so that air moving around the distillation chamber 230 in drawn through a front side of the distillation chamber, through the fan in a radially outward direction, and through coils of the condenser 250. In this embodiment, the coils of the condenser 250 do not pass from front to back. Instead, as shown by the dashed lines in FIG. 9, begin at one side of the chamber and coil about the housing 220 towards and to the other side (right side in FIG. 8). Spaces are left between each coil to permit the passage of cooling air from the fan 240. Of course, the coils can traverse in a variety of directions about the fan 240.

A vapor compressor or vacuum pump is placed on the side of the motor housing 210 opposite the distillation chamber 230. In a vapor compressor configuration, the compressor is fluidically connected to the exterior of the distillation chamber 230 to give up the latent heat of the boiled liquid to heat the untreated liquid. In a vacuum pump configuration, the pump is fluidically connected to the distillation chamber 230 for changing the pressure of the vapors and, thereby, decreasing the boiling temperature of the liquid. This will boil the liquid to be purified at a quicker rate than by simply using a contact heater.

Figure 8:
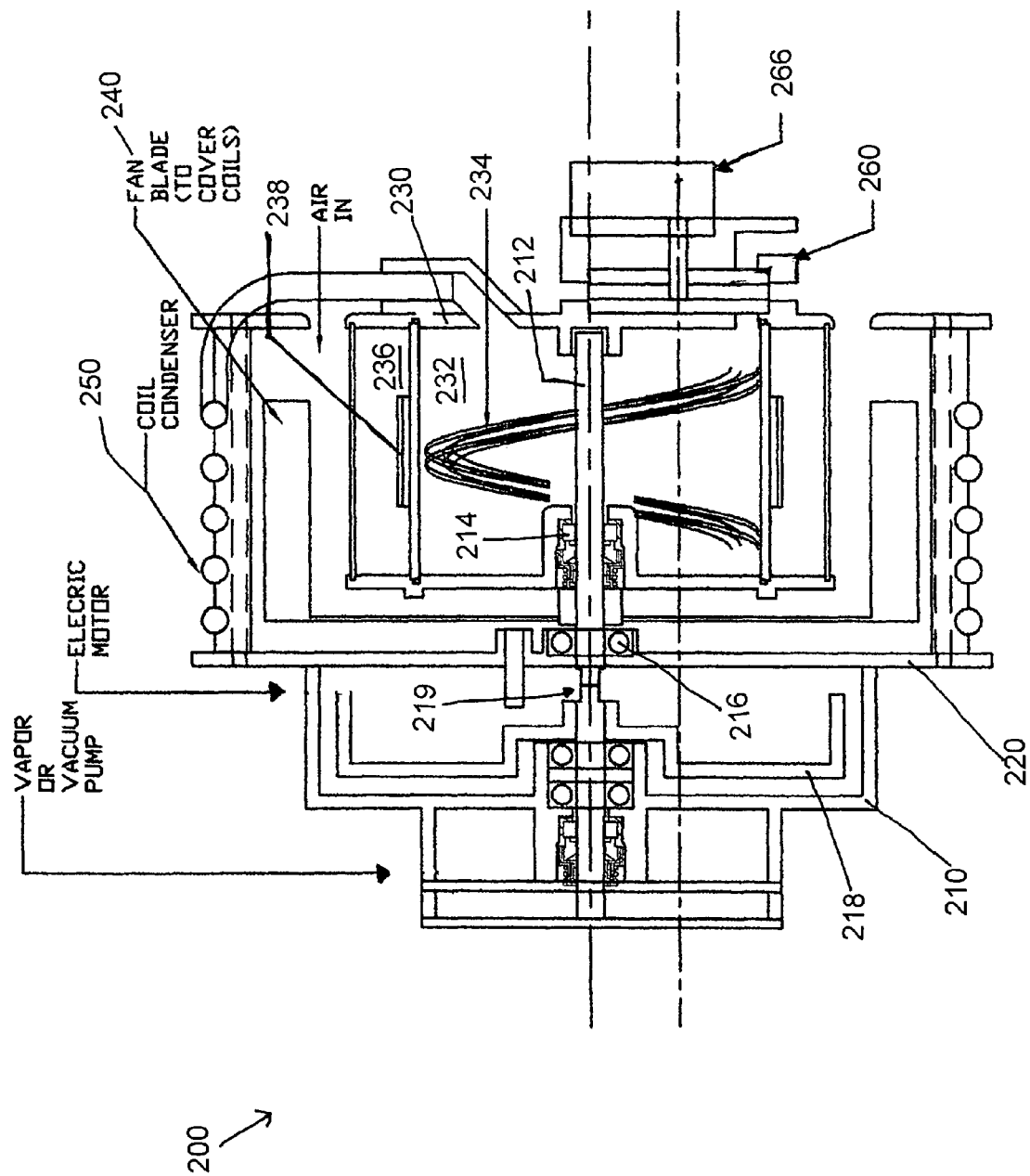
FIG. 8 is a cross-sectional view of another embodiment of a coaxial water purification apparatus according to the invention.

As shown in FIG. 8, the valve(s) 260 for controlling the apparatus 200 is no longer entirely within a housing. This valve 260 is, as shown in the exploded view of FIG. 10, composed of two plates, a stationary valve 262 and a rotating valve 264. Rotation of the rotating valve 264 is effected by a valve motor 266.

Figure 11:
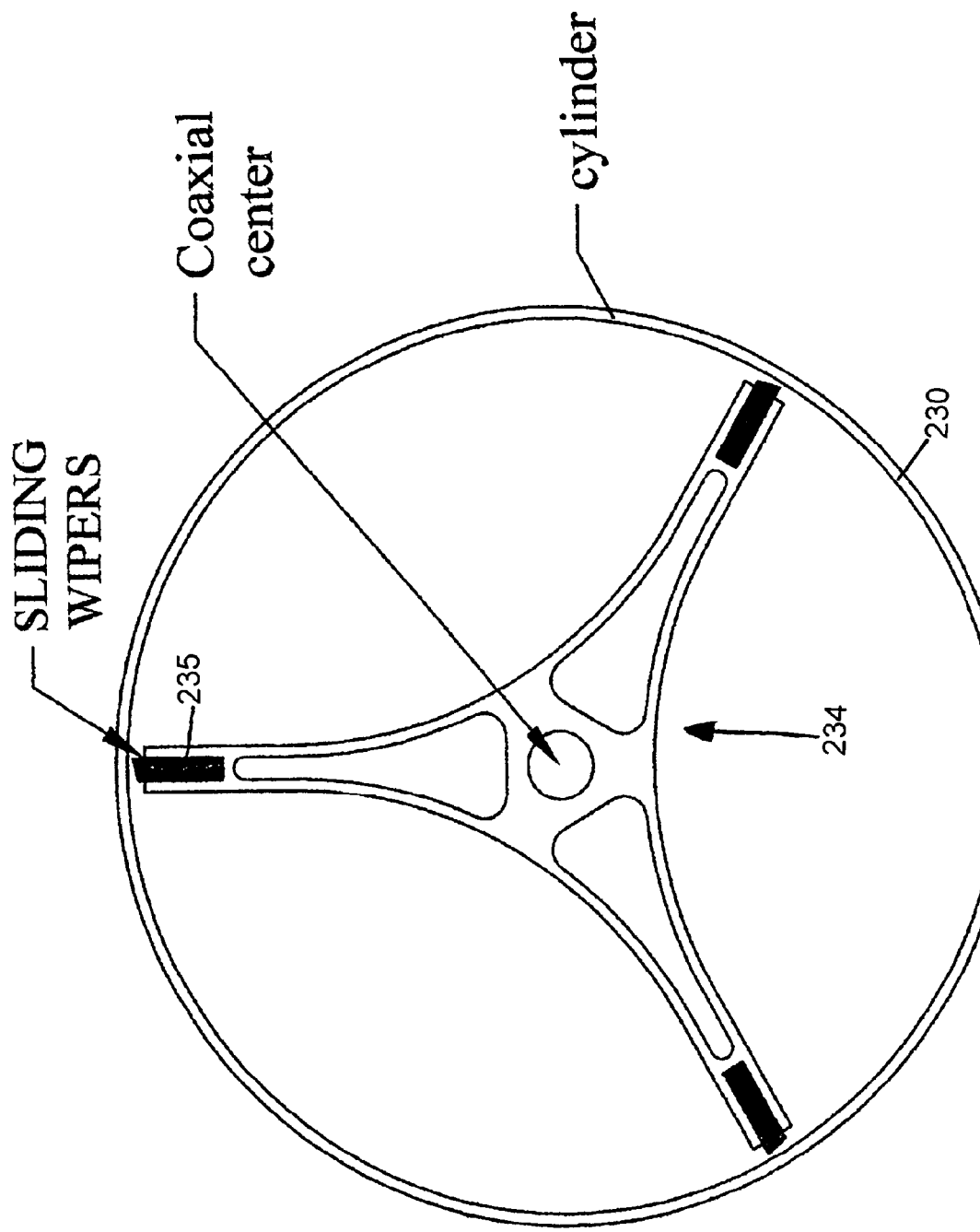
FIG. 11 is a cross-sectional view of the rotator of the apparatus of FIG. 9.

FIGS. 9 and 11 illustrate an alternative embodiment of the rotator 234. Here, the rotator is a paddle having sliding wipers 235. These wipers 235 are at a distance from the interior cylindrical surface of the distillation chamber 230. Rotation of the rotator 234 creates the thin film of fluid that can heat evenly and clean the inside surface by its movement over the interior surface. Such movement substantially or entirely prevents matter build-up on the interior surface. If any matter does build-up, the wipers will prevent that build-up from accumulating by frictional contact between the wipers 235 and the matter. If desired, the rotator can be semi-flexible or can have the blades be of a semi-flexible material, or the blades can be movable so that, when exposed to centrifugal forces, they move outward to shorten or entirely close the gap between the rotator and the interior surface of the distillation chamber.

It is further intended that any other embodiments of the present invention that result from any changes in application or method of use or operation, method of manufacture, shape, size, or material that are not specified within the detailed written description or illustrations contained herein yet are considered apparent or obvious to one skilled in the art are within the scope of the present invention.

I claim:

1. A liquid purification system, comprising:
 a rotationally fixed cylindrical boiling chamber having:
  a cylindrical interior surface defining a central axis;
  an exterior surface; and
  two opposing end surfaces, said cylindrical interior surface and said end surfaces defining a distillation chamber;
 a rotator rotationally disposed within said distillation chamber about said central axis and radially extending at least partly towards said cylindrical interior surface;
 a temperature regulating heater disposed about said exterior surface, said heater structured to heat liquid in said distillation chamber at least to a boiling point of the liquid;
 a rotational valve having a plurality of ports, each of said plurality of ports selectively fluidically connected to said distillation chamber;

a valve controller selectively actuating said valve to fluidically connect each of said plurality of ports to said distillation chamber in a given sequence;

a liquid dispensing unit for supplying the liquid to be purified to said distillation chamber, said liquid dispensing unit being fluidically connected to at least one of said plurality of ports and automatically and repetitively dispensing a given amount of the liquid to said distillation chamber when said valve opens said liquid dispensing unit to said at least one port;

a motor drivingly connected to said rotator and, operative to rotate said rotator about said central axis at a speed sufficient to force liquid inside said distillation chamber into a moving film, coating and moving along said cylindrical interior surface;

a condenser disposed about said heater and having:
    an inlet fluidically connected to at least one of said ports for receiving distilled vapors from said distillation chamber; and
    a discharge fluidically connected to said inlet for supplying a purified liquid; and a blower disposed about said heater and within said condenser and, when activated, moving environmental air along said condenser to cool said condenser and condense distilled vapors of the liquid inside said condenser.

2. The purification system according to claim 1, wherein:
said distillation chamber has a drainage passage; and
said rotator is shaped to forcefully directed material in said distillation chamber toward and through said drainage passage.

3. The purification system according to claim 1, wherein said distillation chamber has a volume between approximately 8 ounces and approximately 100 gallons.

4. The purification system according to claim 1, wherein said central axis is horizontally oriented.

5. The purification system according to claim 1, wherein said rotator is semi-flexible.

6. The purification system according to claim 1, wherein said rotator has a portion of a semi-flexible material and said portion contacts said interior surface when exposed to centrifugal forces.

7. The purification system according to claim 1, wherein said rotator has a movable portion for selectively contacting said interior surface.

8. The purification system according to claim 1, wherein said rotator includes features forming at least one of a paddle, an auger, and a brush.

9. The purification system according to claim 1, wherein an outer diameter of said rotator is smaller than an inner diameter of said distillation chamber.

10. The purification system according to claim 1, wherein said rotator touches said interior surface.

11. The purification system according to claim 1, wherein the liquid is selected from at least one of the group consisting of tap water, ocean water, pond water, stream water, river water, street runoff, and industrial waste water.

12. The purification system according to claim 1, wherein said valve has a central axis parallel to and offset from said central axis of said cylindrical interior surface.

13. The purification system according to claim 1, wherein said valve is coaxial with said central axis of said cylindrical interior surface.

14. The purification system according to claim 1, wherein said valve has at least one stationary plate and one rotating plate.

15. The purification system according to claim 1, wherein said valve has a series of three stacked discs including two stationary discs and one rotating disc.

16. The purification system according to claim 15, wherein said disks are of a material selected from at least one of the group consisting of ceramic, steel, alloys, and plastic.

17. The purification system according to claim 1, wherein said valve controller has a pre-set program set to positively vent and purge vapors boiling out of the liquid at a temperature below the boiling point of the liquid, said program being based on at least one of time and temperature.

18. The purification system according to claim 1, wherein at least one of said plurality of ports is fluidically connected to a water source for supplying water to said distillation chamber.

19. The purification system according to claim 1, wherein said heater is selected from one of:
    a bonded, proportionally temperature-controlled, electric heating element;
    self regulating, non-controlled positive temperature coefficient heating elements; superheated vapor compression passages; and
    a combination of at least two of said electric heating element, said heating elements, and said passages.

20. The purification system according to claim 1, further comprising a reservoir fluidically connected to said discharge for at least temporarily storing the purified liquid.

21. The purification system according to claim 20, further comprising at least one of:
    a heater thermally connected to said reservoir for keeping the purified liquid at a temperature above room temperature;
    a chiller thermally connected to said reservoir for keeping the purified liquid at a temperature below room temperature; and
    an additive dispenser fluidically connected to said reservoir for adding a substance to the purified liquid.

22. The purification system according to claim 21, wherein said substance is at least one of the group consisting of a flavor, a mineral, and a vitamin.

23. The purification system according to claim 1, wherein said heater completely encircles a 360-degree exterior of said exterior surface.

24. The purification system according to claim 1, wherein said heater is temperature adjustable.

25. The purification system according to claim 1, wherein said heater has a selective temperature controller for selecting a desired temperature of said heater.

26. The purification system according to claim 1, further comprising a vapor compressor fluidically connected to said distillation chamber for raising vapor temperature in said distillation chamber.

27. The purification system according to claim 1, further comprising a vacuum pump fluidically connected to said distillation chamber for lowering a boiling point of the liquid in said distillation chamber.

28. The purification system according to claim 1, further comprising an insulation layer between said heater and said blower and encapsulating said heater to shield thermally said blower from said heater.

29. The purification system according to claim 1, wherein said condenser has cooling tubes oriented parallel to said central axis.

30. The purification system according to claim 1, wherein said condenser has cooling tubes coiling about said central axis.

31. The purification system according to claim 1, wherein said blower is rotationally connected to said rotator for rotating said blower with said rotator.

32. The purification system according to claim 1, further comprising a gear assembly rotationally connecting said blower and said rotator to one another for rotating said blower at a speed different from said rotator.

33. The purification system according to claim 1, further comprising a blower motor rotationally connected to said blower for rotating said blower at a speed independent of a rotational speed of said rotator.

34. The purification system according to claim 1, wherein said distillation chamber has a diameter of between approximately 5 inches and approximately 96 inches.

35. The purification system according to claim 1, wherein said motor rotates said rotator at a speed of between approximately 300 rpm and approximately 1200 rpm.

36. The purification system according to claim 35, wherein said motor rotates said rotator at a speed of between approximately 350 rpm and approximately 800 rpm.

37. A liquid purification system, comprising:
a rotationally fixed, horizontally disposed cylindrical boiling chamber having:
a cylindrical interior surface defining a central axis;
a exterior surface; and
two opposing substantially parallel and planar end surfaces on either side of said cylindrical interior surface, said cylindrical interior surface and said end surfaces defining a distillation chamber;
a rotator rotationally disposed within said distillation chamber about said central axis and radially extending at least partly towards said cylindrical interior surface, said rotator having an outer radial surface;
a rotationally fixed, temperature regulating heater circumferentially disposed about said exterior surface and evenly heating liquid in said distillation chamber at least to a boiling point of the liquid;
a rotational valve having a plurality of ports each selectively fluidically connected to said distillation chamber, said plurality of ports including a fill port, a purge port, a distilled vapor port, a rinse port, and a drain port;
a valve controller selectively controlling said valve to fluidically connect each of said plurality of ports to said distillation chamber in a given sequence;
a motor having an axle drivingly connected to said rotator and structured to rotate said rotator about said central axis at a speed sufficient to force liquid inside said distillation chamber into a moving film coating said cylindrical interior surface and moving therealong, said rotator cooperatively dimensioned and disposed relative to said cylindrical interior surface to define a thickness of said moving film sufficient to span a distance between said outer radial surface of said rotator and said cylindrical interior surface;
a cylindrical condenser circumferentially disposed about said heater, said condenser having:
an inlet fluidically connected to said distilled vapor port for receiving distilled vapors from said distillation chamber;
a discharge fluidically connected to said inlet for supplying a purified liquid; and
a condenser tube fluidically connecting said inlet to said discharge; and
a cylindrical blower circumferentially and rotationally disposed about said heater and within said condenser tube and, when activated, moving environmental air along said condenser tube to cool said condenser tube and condense distilled vapors of the liquid inside said condenser tube.

38. The liquid purification system according to claim 37, wherein said valve controller selectively controls said valve to fluidically connect said fill port, said purge port, said distilled vapor port, said rinse port, and said drain port to said distillation chamber in sequence.

39. A liquid purification system, comprising:
a rotationally fixed cylindrical boiling chamber having:
a cylindrical interior surface defining a central axis;
an exterior surface; and
two opposing end surfaces, said cylindrical interior surface and said end surfaces defining a distillation chamber;
a rotator rotationally disposed within said distillation chamber about said central axis and radially extending at least partly towards said cylindrical interior surface;
a temperature regulating heater disposed about said exterior surface, said heater structured to heat liquid in said distillation chamber at least to a boiling point of the liquid;
a rotational valve having a plurality of ports, each of said plurality of ports selectively fluidically connected to said distillation chamber;
a valve controller selectively actuating said valve to fluidically connect each of said plurality of ports to said distillation chamber in a given sequence;
a motor drivingly connected to said rotator and, operative to rotate said rotator about said central axis at a speed sufficient to force liquid inside said distillation chamber into a moving film, coating and moving along said cylindrical interior surface;
a condenser disposed about said heater and having:
an inlet fluidically connected to at least one of said ports for receiving distilled vapors from said distillation chamber; and
a discharge fluidically connected to said inlet for supplying a purified liquid;
a blower disposed about said heater and within said condenser and, when activated, moving environmental air along said condenser to cool said condenser and condense distilled vapors of the liquid inside said condenser;
a reservoir fluidically connected to said discharge for at least temporarily storing the purified liquid; and
at least one of:
a heater thermally connected to said reservoir for keeping the purified liquid at a temperature above room temperature;
a chiller thermally connected to said reservoir for keeping the purified liquid at a temperature below room temperature; and
an additive dispenser fluidically connected to said reservoir for adding a substance to the purified liquid, wherein said substance is at least one of the group consisting of a flavor, a mineral, and a vitamin.

* * * * *